Oct. 3, 1939.   C. E. TIDEMAN   2,175,069
WIRE-DRAWING MACHINE
Filed June 2, 1938   2 Sheets-Sheet 1

Inventor:
Carl E. Tideman
By Charles A. Warren
Attorney

Oct. 3, 1939.          C. E. TIDEMAN          2,175,069
WIRE-DRAWING MACHINE
Filed June 2, 1938          2 Sheets-Sheet 2

Inventor:
Carl E. Tideman
By Charles A. Warren
Attorney

Patented Oct. 3, 1939

2,175,069

UNITED STATES PATENT OFFICE 2,175,069

WIRE-DRAWING MACHINE

Carl E. Tideman, Worcester, Mass., assignor of one-half to Verner G. Anderson, Worcester, Mass.

Application June 2, 1938, Serial No. 211,403

2 Claims. (Cl. 205—13)

The present invention relates to a wire drawing machine and particularly to a machine in which the block is hydraulically driven.

Blocks used in drawing wire must of necessity be driven by a source of power which can provide a relatively high torque and the conventional structure for this purpose is a drive shaft connected through gearing to the blocks by a jaw clutch. This type of clutch has been found to be most satisfactory for transmitting the high torque necessary to rotate the block. This type of clutch makes it impossible to start the blocks slowly, since, when the clutch is engaged, the block must immediately rotate at the speed which is determined by the gear ratio between the drive shaft and the block. This sudden starting of the block through the jaw clutch inevitably results in frequent breakage of the wire being drawn through the die and also frequent damage to the die itself.

When a drawing machine is being "strung up" the end of the wire must be wound on the block manually and the block is then started to draw the wire through the die. The sudden starting of the block when the jaw clutch is engaged makes the position of the operator of the machine dangerous by reason of a possibility of breakage of the wire, or of injury to the operator through the sudden movement of the wire as the block begins its rotation.

To avoid the objection to the quick starting of the blocks through the action of jaw clutches, these clutches have been replaced in certain instances by friction clutches. Because of the high torque to be transmitted, friction clutches must be of an extremely large size, and by reason of the amount of torque transmitted while the friction clutch is partly engaged, these clutches are subjected to excessive wear and have a necessarily short life. The cost of repair as well as the extremely large size required makes the use of friction clutches objectionable, and in certain instances, prohibitive.

A further objection to the use of jaw or friction clutches is that the power is necessarily transmitted through a gear box of one form or another in order that the rate of rotation of the block may be controlled to some extent. Wherever any gearing is utilized the inevitable vibration of the block results in a non-uniform drawing action which leaves "chatter marks" on the surface of the wire. The principal feature of the present invention resides in the provision of an hydraulic drive for the wire block which will avoid the objections above outlined and will provide for accurate control of the rate of rotation of the block.

In wire drawing machines where the wire is drawn successively through several dies, each smaller in diameter than the proceding, the several wire blocks must be driven at such relative speeds as to provide for the proper amount of slack in the wire between each block and the succeeding die. In many cases the gearing necessary to obtain exactly the desired rate of rotation cannot be readily obtained and one of the features of the invention is the provision of a drive for the wire block in which the rate of rotation is infinitely variable between predetermined maximum and minimum limits.

To avoid the objection to mechanically driven wire blocks, wire drawing machines have been provided with an individual electric motor drive for each block. For each driving motor there must be a control panel by which the rate of rotation of the motor may be controlled, and it will be obvious that if the range of speeds between the minimum and maximum limits must be large, the motor cannot function efficiently. Moreover, by reason of the rate of rotation of the wire block, an extremely heavy motor with a high torque must be provided, and with such a motor it is practically impossible to provide for infinite variations in speed, since the standard speed control for electric motors of this character provides for step-by-step control with each change of speed a definite amount greater or smaller than the original speed. By the present invention the necessity for a control panel is avoided and the wire block may be rotated at any speed between the predetermined maximum and minimum limits.

Other and further objects and advantages of the invention will hereinafter more fully appear from the following detailed description taken in connection with the accompanying drawings in which—

Fig. 6 is a sectional view along the line 6—6 of Fig. 3.

Like reference characters refer to like parts in the different figures.

Figure 1:
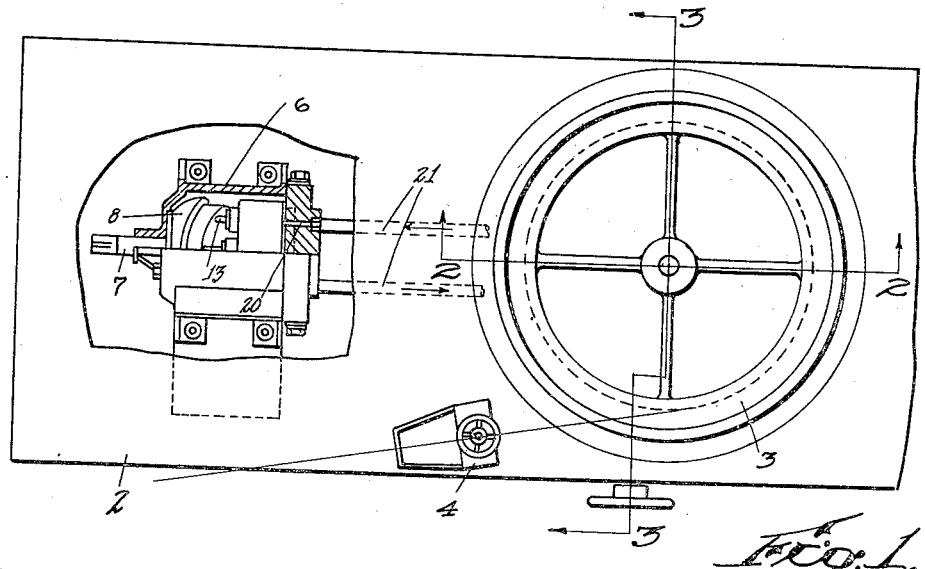
Fig. 1 is a plan view of a portion of a wire drawing machine embodying the invention, with parts broken away.
Figure 2:
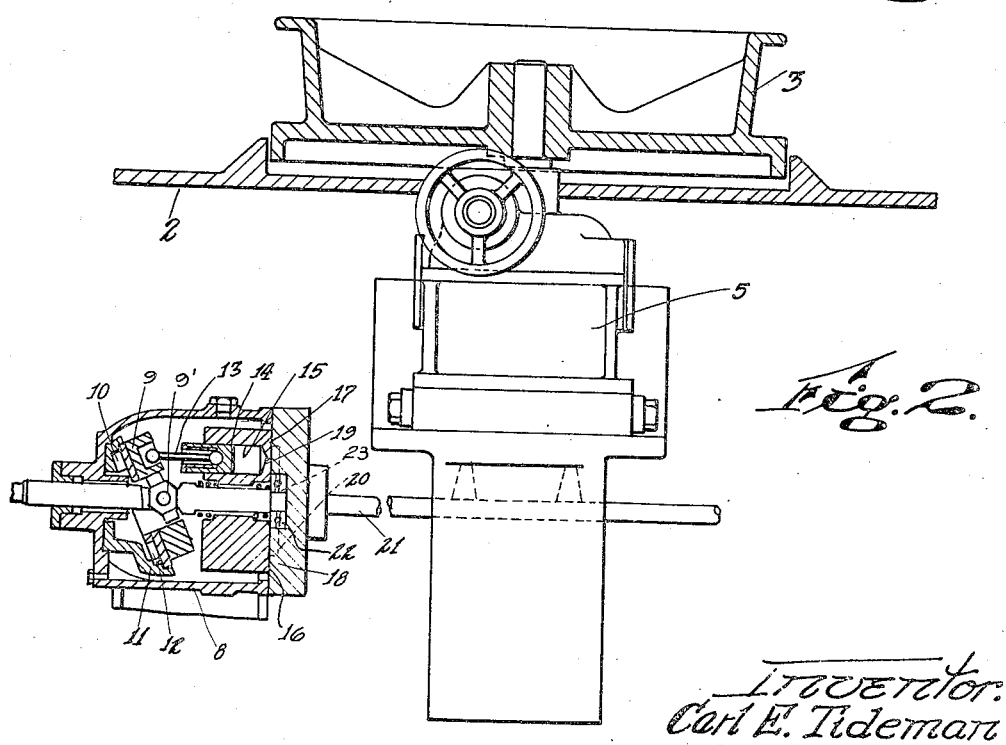
Fig. 2 is a vertical sectional view partly along the line 2—2 of Fig. 1.
Figure 3:
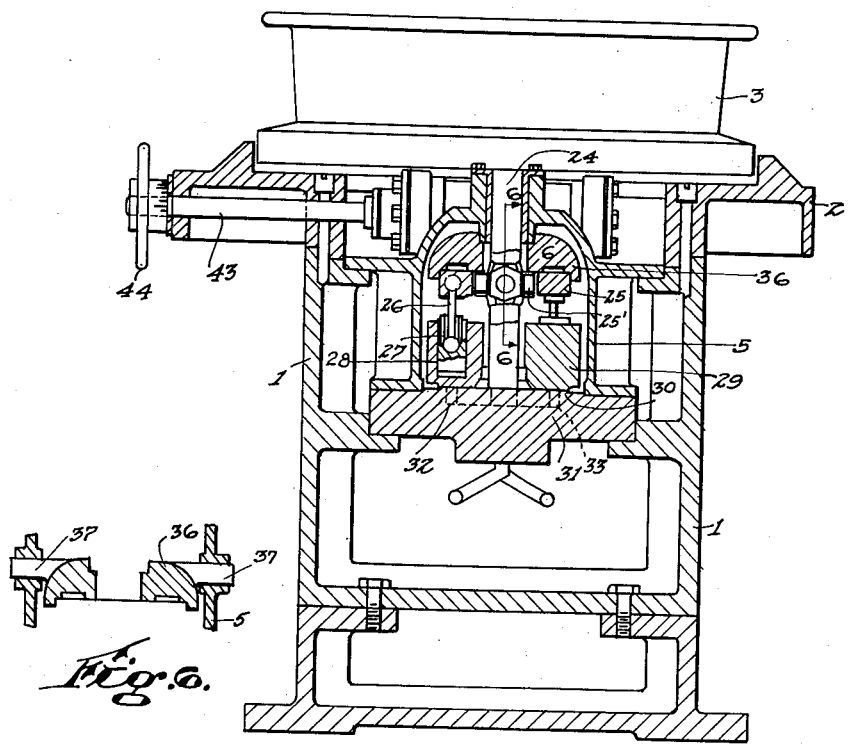
Fig. 3 is a sectional view along the line 3—3 of Fig. 1.

With reference first to Figs. 1 and 2, the wire drawing machine comprises a base 1, Fig. 3, having a plurality of adjoining sections 2 on each of which is mounted a wire block 3. Adjacent to each wire block is a die 4 of conventional form.

In accordance with the present invention each wire block is driven by an hydraulic motor 5, shown in detail in Fig. 3, the fluid under pressure for the motor being supplied by a suitable pump 6, shown in section in Figs. 1 and 2. It will be understood that any suitable constant volume hydraulic pump or source of fluid under pressure may be utilized, or in certain instances, if the hydraulic motor for driving the wire block is a constant volume motor, the source of fluid under pressure may be a variable volume source in order to provide for adjustment of the speed of rotation of the wire block. However, it has been found most desirable to utilize a constant volume source of fluid under pressure and to use a variable speed hydraulic motor for driving the wire block or blocks of the machine.

In the specific embodiment shown, the hydraulic pump 6 is a constant volume source of fluid under pressure and comprises a drive shaft 7 journalled in a housing 8 and suitably connected to a source of power, not shown. The shaft 7 has secured thereto, at its inner end, a plate 9 engageable with the obliquely positioned surface 10 of a member 11 positioned within the housing. Suitable anti-friction bearings 12 are located between the member and plate, for free movement of the plate.

The plate 9 is secured to the shaft by a universal-joint type of connection 9' to provide for rotation of the plate with the shaft 7 and for oscillatory movement of the plate as it rotates. Pivotally mounted in the plate 9 are a plurality of piston rods 13 uniformly spaced from the axis of the drive shaft and angularly spaced on the plate. The opposite end of each piston rod carries a piston 14 slidable in a cylinder 15 provided by a block 16 mounted for rotation within the housing. The outer or right hand end surface 17 of the block engages with a valve plate 18 by which the flow of fluid into and out of the cylinders is controlled. The block 16 has a plurality of ports 19 extending between each of the cylinders and the end surface 17 in line with the slots 20 in the valve plate. These slots are similar to the slots in the valve plate for the hydraulic motor, hereinafter described in detail, and provide for intake and exhaust of fluid under pressure during the rotation of the plate 9 and block 16. The opposite valve slots are connected by suitable conduits 21 to the intake and exhaust ports of the hydraulic motor. Friction between the block and the valve plate may be reduced by end thrust bearings 22 carried on the drive shaft 7, the end of which projects, as shown, into a central opening 23 in the valve plate.

It will be apparent that as the drive shaft rotates, the pistons are moved into and out of the cylinders by the oscillation of the member 11, resulting from the oblique position of the surface 12 with which the member engages. The pistons have a predetermined length of stroke and accordingly, for a predetermined rate of rotation of the drive shaft, a constant volume of fluid under pressure is supplied for actuating the hydraulic motor.

Figure 5:
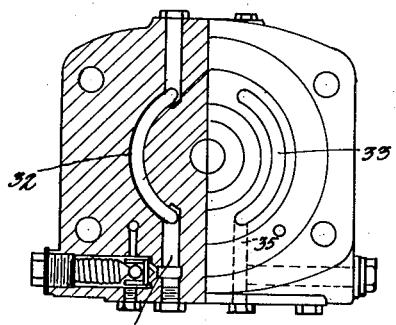
Fig. 5 is a view, partly in section and partly in elevation of the valve plate of Fig. 3.
Figure 4:
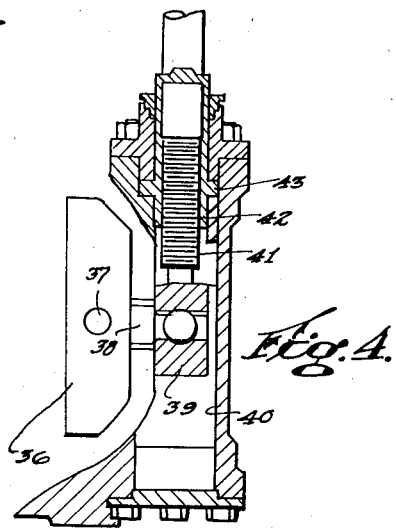
Fig. 4 is a fragmentary sectional view showing an adjustment for the driving motor of Fig. 3.

Referring now to Figs. 3 to 5 inclusive, the hydraulic motor is very similar to the pump, with the exception that the length of stroke of the pistons is adjustable to provide for changing the rate of rotation of the motor shaft when a constant volume of fluid under pressure is supplied to the motor. As shown, the motor housing is mounted within the base 1 of the machine and has journalled therein the motor shaft 24 to the upper end of which the wire block 3 is secured. A plate 25 is held against rotation on the shaft, although mounted for rocking movement thereon, as by a universal-joint type of connection 25'. The plate 25 has connected thereto a plurality of piston rods 26. Pistons 27 are secured to each of the piston rods and the several pistons are slidable in cylinder bores 28 in a block 29 turnable with the motor shaft. The under surface 30 of the cylinder block engages with a valve plate 31 mounted within the base 1 and secured to the housing. The cylinder block has ports extending between the inner ends of the cylinder bores and the under surface to communicate with valve slots 32 and 33, Fig. 4, provided by the valve plate. It will be noted that each of the slots is arcuate and communicates with a channel 34 or 35 in the valve plate, the channels being connected to the conduits 21 above referred to.

For controlling the rate of rotation of the block, the housing for the motor has positioned therein the member 36 engaging with the plate 25 to which the piston rods 26 are secured. Suitable anti-friction bearings are positioned between the plate 25 and member 26, as will be apparent. As shown in Fig. 6, the member 36 is supported by projecting lugs 37 engaging in the housing. Rocking movement of the member 36 about the axes of the lugs 37 will change the angularity of the plate relative to the drive shaft 24 and thereby vary the length of stroke of the pistons 27. For varying the angularity of the plate 36, the latter has a projecting tongue 38 engageable in a block 39 slidable in guideways 40 provided by the motor housing. The block has an integral threaded rod 41 engaging in a threaded nut 42 held against longitudinal movement in the housing as by an integrally projecting flange 43. The nut is in the form of a sleeve to the end of which is connected a control wheel 44 by which the position of the member 36 is changed.

It will be apparent that the member 36, when in the position of Fig. 3, provides for no rotation of the block since the entire operative face of the member 36 is at right angles to the motor shaft 24. However, as the member 36 is shifted into a slightly oblique position the block will rotate at its maximum rate. As the member 36 becomes more oblique to the shaft axis, the rotation of the block decreases until when the member 36 reaches the most oblique position possible, the rate of rotation of the block is at a minimum, as the length of piston stroke is a maximum.

As the structure of the hydraulic pump and motor shown is well known it need not be described in any further detail. It will be understood that the specific pump and motor described are merely illustrative and other suitable hydraulic motors or pumps may be substituted.

Since the source of fluid under pressure is a constant volume source, it will be understood that the wire block will rotate at a constant speed so long as the control wheel is in a predetermined position. This speed, however, may be adjusted to a greater or less speed by shifting the position of the control wheel. A plurality of wire blocks may obviously be driven from a single source since the rate of rotation of each block may be controlled individually.

I claim:

1. A wire drawing machine, comprising a base, an hydraulic motor positioned within the base and having a driven shaft extending vertically upward therefrom, a wire block mounted directly on said shaft, said motor having a plurality of parallelly reciprocable pistons and piston rods extending therefrom, a driving connection between said piston rods and the driven shaft, and a member cooperating with said driving connection, and by its obliquity to the direction of piston reciprocation, controlling the rate of rotation of the driven shaft, and means on the base of the machine for adjusting the obliquity of the member.

2. A wire drawing machine, comprising a base, an hydraulic motor positioned within the base and having a driven shaft extending vertically upward therefrom, a wire block mounted directly on said shaft, said motor having a cylinder block, a plurality of vertically reciprocable pistons therein, and piston rods extending upwardly therefrom, a plate to which said piston rods are connected and which is mounted for rotation with the driven shaft, a member surrounding the driven shaft and supporting said plate, said member, by its obliquity to the piston reciprocation, controlling the rate of rotation of the driven shaft, and means on the base of the machine and accessible at the front thereof for adjusting the obliquity of said member.

CARL E. TIDEMAN.